United States Patent [19]
Gehlbach

[11] 3,901,193
[45] Aug. 26, 1975

[54] FEED GRAIN DISTRIBUTION SYSTEM

[76] Inventor: George Gehlbach, R.R. 3, Box 61, Lincoln, Ill. 62656

[22] Filed: June 17, 1974

[21] Appl. No.: 480,147

[52] U.S. Cl................................. 119/52 AF; 119/53
[51] Int. Cl.²........................................... A01K 5/02
[58] Field of Search........ 119/52 AF, 53, 51.11, 56; 214/16 R, 17 CA

[56] References Cited
UNITED STATES PATENTS

| | | | |
|---|---|---|---|
| 3,230,933 | 1/1966 | Myers et al. ........................... | 119/53 |
| 3,653,361 | 4/1972 | Holliday .......................... | 119/52 AF |

*Primary Examiner*—Hugh R. Chamblee
*Attorney, Agent, or Firm*—Neal J. Mosely

[57] ABSTRACT

A feed grain distribution system comprises a grain storage bin, and an intermediate feed supply hopper, and individual storage bins or feeding stations to which the grain is supplied. Means is provided for supplying grain to the hopper and further means provided for supplying grain from the hopper to individual bins or feeding stations. Control means for the system includes switch means in the supply hopper to actuate the feed means for transferring feed to the individual bins or feeding stations and means to inactivate the feed supplying means when the last bin or feeding station is filled and to stop the supply of feed from the main storage bin when the intermediate supply hopper is filled to a particular level.

9 Claims, 1 Drawing Figure

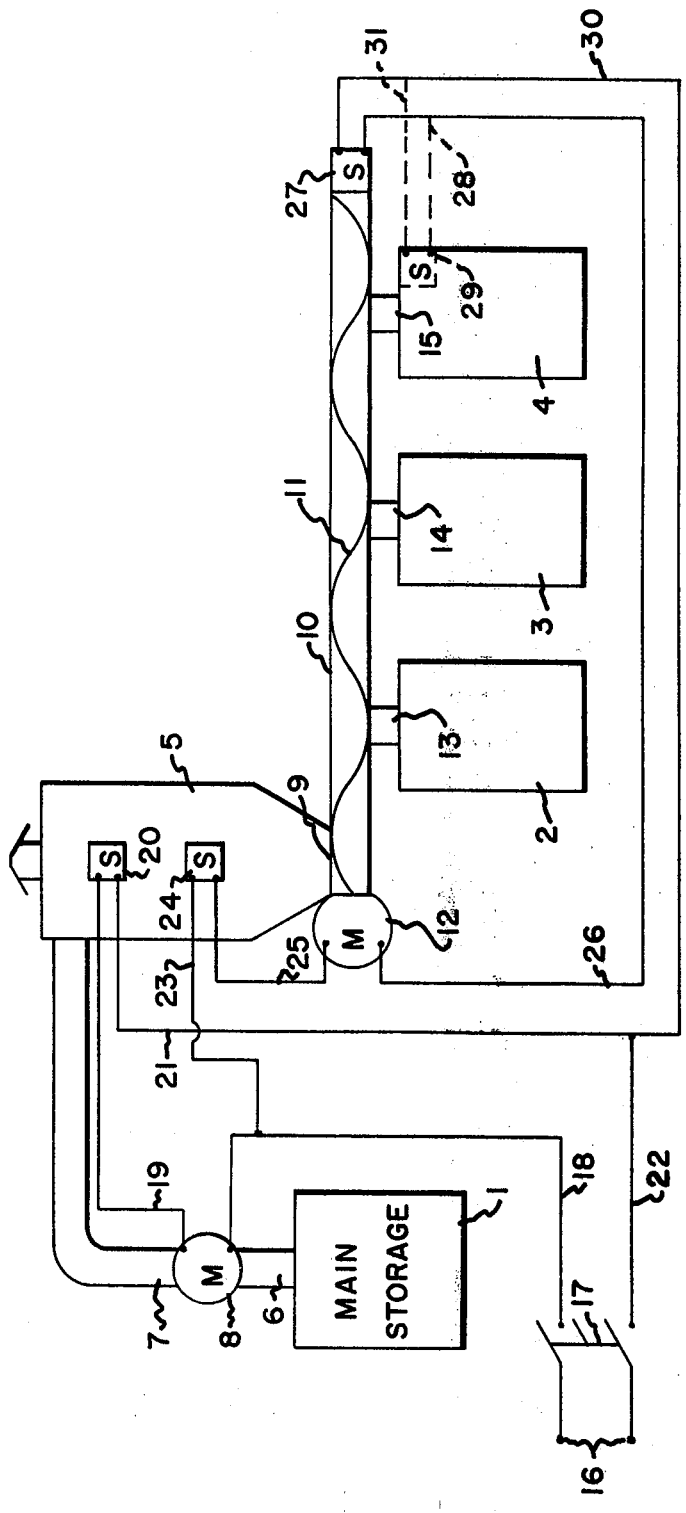

FEED GRAIN DISTRIBUTION SYSTEM

STATEMENT OF THE INVENTION

1. Field of the Invention

This invention relates to a new and improved feed grain distribution system. In this system feed grain or other particulate or pulverulent feed material is moved from a main storage bin to a plurality of separate storage bins or feeding stations and the movement of the feed is controlled by a variety of control means at different locations in the system.

2. Brief Description of the Prior Art

Brewer U.S. Pat. No. 3,110,420 discloses a feed supply hopper with a lever control switch for controlling flow or distribution of feed or powder or particulate solids.

Gillette U.S. Pat. No. 3,339,530 discloses an animal feeding system with a reversing auger for changing direction of flow of the feed.

Hagans U.S. Pat. No. 3,225,742 discloses an animal feed distribution apparatus with timed release of separate feed dispenser boxes.

Ellis U.S. Pat. No. 3,669,076 discloses a feed dispenser with a storage hopper rotatable to supply feed to an annular-shaped trough.

Bracket U.S. Pat. No. 3,184,109 discloses a feeding system for dispensing feed grain to a plurality of bins with means to inactivate the system when the last bin is full.

Sutton U.S. Pat. No. 3,119,526 discloses a stock feeding apparatus which is actuated on demand.

Wert U.S. Pat. No. 3,545,408 discloses an apparatus for feeding animals at predetermined time intervals.

Thompson U.S. Pat. No. 3,534,709 discloses a system for conveying and dispensing feed to livestock at individual stations in measured quantities and for restraining the animals while feeding and milking.

Buschbom et al. U.S. Pat. No. 3,292,585 discloses animal feed conveying means including an auger arrangement for dumping feed uniformly along a feed bunk.

SUMMARY OF THE INVENTION

This invention comprises a new and improved apparatus for distributing feed grain or equivalent material, e.g. powdered or particulate foodstuffs, from a main storage bin to a plurality of separate storage bins or feed stations. Means is provided for transferring feed grain from the main storage bin to an intermediate storage hopper and a separate means is provided for transferring the grain from the storage hopper to the individual storage bins. Automatically powered means, electrically powered or equivalent, transfer feed grain from the main storage bin to intermediate hopper upon manual actuation. Means is provided in the hopper to control automatically operated conveyor means, an auger or equivalent, to transfer feed grain to individual storage bins or feeding stations. Automatic control switching means is provided to response to filling of the last of the storage bins or feeding stations to stop the operation of the feeding means from the storage hopper. Automatic control means in the storage hopper then shuts down the feed means from the main storage bin when the feed grain level reaches a predetermined height in the storage bin.

BRIEF DESCRIPTION OF THE DRAWING

The single drawing is a schematic view of a storage bin, supply hopper, and a plurality of individual bins or hoppers to which feed grain is distributed, together with conduits for transporting feed grain and means for controlling the transport of feed grain.

DESCRIPTION OF THE PREFERRED EMBODIMENT

Referring now to the drawings by numerals of reference, there is shown a preferred embodiment of the subject invention in somewhat schematic form. The invention comprises a new and improved feed grain distribution system for transporting feed grain, or equivalent particulate or pulverulent material, from a main storage bin 1 (or mill or other processing unit) to a plurality of separate storage bins 2, 3 and 4 which may, if desired, also be feeding stations or may have openings for discharge to individual feeding stations. The feed grain from main storage bin 1 is transported to individual bins 2, 3 and 4 by way of intermediate storage hopper 5 which functions as a distribution point and control center for the system.

From storage bin 1 there are provided conduits 6 and 7 extending to the upper end of intermediate storage hopper 5. An electric motor 8 is provided for operation of the means for moving the grain from main storage bin 1 to intermediate hopper 5. The motor 8, and associated conveying means is preferably a pneumatic system for blowing the grain from main storage bin 1 into hopper 5, although a conventional auger type conveyor could be used if desired.

Intermediate hopper 5 has an outlet 9 at its lower end which opens into conveyor tube 10 which contains auger 11 (or equivalent conveyor means) operated by motor 12. The motor operated auger 11 transports grain from hopper 5 through conveyor tube 10 to inlet openings 13, 14 and 15 to the individual storage bins 2, 3 and 4 respectively.

The feed distribution system or apparatus is preferably powered from an electric power source 16 which is controlled by a single-throw double pole switch 17. From switch 17, electrical lead 18 is connected to one side of motor 8, the other side of which is connected by electric lead 19 to one side of automatic switch 20 located in the upper portion of intermediate supply hopper 5. The other side of switch 20 is connected by electric lead 21 to electric lead 22 leading back to the other side of switch 17. Electric lead 18 is also connected to electric lead 23 which is connected to one side of automatic switch 24 located in the middle or lower middle portion of intermediate hopper 5. The other side of switch 24 is connected by electric lead 25 to one side of motor 12 which operates feed supply auger 11.

The other side of motor 12 is connected by electric lead 26 to one side of automatic switch 27 positioned at the end of feed supply conduit 10. The other side of switch 27 is connected by electric lead 30 to lead 22 which connects back to switch 17 and power source 16. An alternate control circuit is shown for an automatic control switch 29 located in the upper portion of storage bin 4. Switch 29 is connected by lead 28 (shown in dotted line) from lead 26 and lead 31 (shown in dotted line) to lead 30. The system as shown will operate satisfactorily using either or both of the control switches 27 and 29.

The control switches used in this apparatus and system are preferably diaphram operated switches responsive to pressure of the feed grain when it reaches a particular level. Obviously, any equivalent automatically operated switch responsive to feed grain level could be substituted or any equivalent control means responsive to feed grain level. Automatic switch 20 is normally closed and is opened to inactivate the system when the feed grain in hopper 5 reaches the level of that switch. Automatic switch 24 is normally open and prevents actuation of motor 12 until the feed grain reaches the level of switch 24. Automatic switches 27 and 29 are normally closed and are opened when the feed grain fills the last of the individual bins 4 thus inactivating motor 12.

OPERATION

In operation, this apparatus is designed to transport grain from a main storage bin 1 to intermediate hopper 5 and then to individual storage bins 2, 3 and 4 (or more if desired). When the system is initially activated, switch 17 is closed, thus supplying electric power through leads 18 and 19 through motor 8, switch 20, and leads 21 and 22. Switch 20 is normally closed and the circuit through motor 8 is thus complete. Motor 8 is thus actuated and operates a conventional conveying means, preferably a pneumatic system, e.g. blower, for transporting grain from storage bin 1 to hopper 5.

As the grain is moved from storage bin 1 into hopper 5, switch 24 which is normally open in the control circuit for that motor. The feed grain thus fills up in hopper 5 until it reaches the level of automatic switch 24. At this point, switch 24 is closed for actuation of motor 12.

When switch 24 is closed, an electric circuit is complete through leads 18 and 23 to switch 24, lead 25 to one side of motor 12, lead 26 to either or both of normally closed switches 27 and 29, and leads 30 and 22 back to the power source. With this circuit being closed, motor 12 begins to operate feed supply auger 11 (or equivalent feed conveying means) to transport feed grain from hopper 5 through conduit 10 to the individual storage bins 2, 3 and 4, respectively. Auger 11 moves the feed grain through conduit 10 to openings 13, 14 and 15 to the bins 2, 3 and 4, respectively, and continues to function until those bins are filled.

At the beginning of the operation, bin 2 will tend to fill first and then bin 3 and finally bin 4, although some grain will be moved to bins 3 and 4 even before bin 2 is filled.

As bins 2 and 3 are filled and grain is transported into bin 4 the system approaches the end of its normal cycle of operation. When bin 4 is filled it actuates automatic switch 29 to open the same to inactivate the circuit for auger motor 12. It should be noted that switch 29 is shown in parallel with switch 27 and is an alternate switch. If switch 29 is used, then switch 27 would probably not be used. If switch 29 is not used in the system then when bin 4 is filled, auger 11 will force the feed grain against automatic switch 27 causing it to open and inactivate the circuit for motor 12. It should be noted that motor 12 then cannot be actuated again until the level of grain in bin 4 or at the end of conduit 10 is lowered to the point where switch 29 or switch 27 is released from the pressure of the feed grain and allowed to close again. Switches 27 and 29 may be in series, if desired, with switch 29 acting as a safety device to prevent damage if switch 27 is not opened.

Claims:

1. A feed grain distribution system comprising:
   a. means for storing a main supply of feed grain,
   b. a plurality of separate feed grain storage units,
   c. an intermediate feed grain distribution unit,
   d. means to move feed grain from said grain storing means to said distribution unit,
   e. means to move feed grain from said distribution unit to said separate grain storage units,
   f. means responsive to a predetermined level of feed grain in said distribution unit to actuate said means to move feed grain to said separate grain storage units,
   g. means responsive to a predetermined higher level of feed grain in said distribution unit to inactivate said first named grain moving means, and
   h. means responsive to the filling of the last of separate grain storage units to inactivate said second named feed grain moving means.

2. A feed grain distribution system according to claim 1 in which said first named and second named feed grain moving means are electrically actuated and each of said responsive means is an automatically actuated switch controlling the actuation of the respective feed grain moving means.

3. A feed grain distribution system according to claim 2 in which said first named feed grain moving means includes a conduit connecting said grain storing means to said grain distribution unit and an electric motor operated means for moving the grain therethrough and said second responsive means comprising an automatic switch responsive to a predetermined higher level of grain in said distribution unit to inactivate said motor operated grain moving means.

4. A feed grain distribution system according to claim 3 in which second named feed grain moving means includes a conduit extending from the bottom of said distribution unit and opening into each of said separate storage units and electric motor operated means for moving the grain therethrough, and said first and third named responsive means comprising automatic switches controlling the activation and inactivation of said last named motor operated means.

5. A feed grain distribution system according to claim 4 in which said first named motor operated means comprises a pneumatic means for moving grain through first named conduit to said distribution unit.

6. A feed grain distribution system according to claim 4 in which said second named motor operated means includes means for mechanically moving the grain through said second named conduit from said distribution unit to said storage units.

7. A feed grain distribution system according to claim 6 in which said mechanical grain moving means is a motor operated auger.

8. A feed grain distribution system according to claim 4 in which said third named responsive means is an automatic switch positioned in the last storage unit to be filled and responsive to the grain level therein.

9. A feed grain distribution system according to claim 4 in which said third named responsive means is an automatic switch positioned in the end of said conduit from said distribution unit to said storage units and actuated when the last of said storage units is filled.

* * * * *